Sept. 6, 1932.   H. GORANSON ET AL   1,876,000
FRUIT PEELING MACHINE
Filed Feb. 23, 1927   5 Sheets-Sheet 1

Fig. 1.

Inventors
Hjalmar Goranson
David Goranson
By Lyon & Lyon
Attorneys

Fig. 4.

Sept. 6, 1932. H. GORANSON ET AL 1,876,000
FRUIT PEELING MACHINE
Filed Feb. 23, 1927 5 Sheets-Sheet 5

Inventors
Hjalmar Goranson
David Goranson
By Lyon & Lyon
Attorneys

Patented Sept. 6, 1932

1,876,000

UNITED STATES PATENT OFFICE

HJALMAR GORANSON AND DAVID GORANSON, OF SAN JOSE, CALIFORNIA, ASSIGNORS TO CALIFORNIA PACKING CORPORATION, OF SAN FRANCISCO, CALIFORNIA, A CORPORATION OF CALIFORNIA

FRUIT PEELING MACHINE

Application filed February 23, 1927. Serial No. 170,126.

This invention relates to a fruit peeling machine of the type in which a relative rotary movement occurs between the fruit and the peeling cutters as they remove the peel.

One of the objects of this invention is to provide means for cutting off the ends of the fruit.

While features of this invention may be applied to peeling machines of various types, the invention is described in the present specification as applied to a machine of a rotary table type with a plurality of peeling mechanisms mounted on the rotary table. In this type of peeling machine the fruit is advanced downwardly, automatically, as the table rotates, past or through the peeling mechanism; the peeling mechanism includes one or more peeling knives or cutters.

One of the objects of the invention is to provide improved means for controlling the position of the cutters with respect to the fruit; also to provide improved means for driving the cutters if they are constructed of rotary type.

In presenting the fruit to the peeling mechanism it is necessary to support the fruit in a holder, and one of the objects of this invention is to improve the construction of this holder enabling it to hold the fruit securely when the ends are being cut off. Also to provide an improved construction for the pusher stem and the cooperating means which holds the fruit against rotation while it is being moved past the peeling knives.

A further object of the invention is to provide simple means for disposing of the peelings as they come from the peeling knives and for guiding the same out of the machine.

In this type of machine the pusher stem moves the fruit past the peeling device and this stem is operated by a relatively fixed cam. There is, however, considerable variation in the size of the fruit, and for this reason the cam and pusher stem do not function as satisfactorily with unusual sizes of fruit as with the regular size. One of the objects of the invention is to provide simple means for quickly adjusting the position of the pusher stem with respect to the cam and the peeling mechanism to adapt the machine to different fruit sizes without necessitating stopping the machine.

Further objects of the invention will appear hereinafter.

The invention consists of the novel parts and combination of parts to be described hereinafter, all of which contribute to produce an efficient fruit peeling machine.

A preferred embodiment of the invention is described in the following specification, while the broad scope of the invention is pointed out in the appended claims.

In its general construction the machine includes a frame 1 upon which a rotary table 2 is mounted on a step bearing 3 which may be in the form of a ball bearing. This table includes an upper plate 4 and a lower plate 5. Above the upper plate a relatively fixed cam 6 is provided which is supported on a plurality of posts 7 which extend up from the frame 1.

The function of this cam is to control the passage of the fruit through or past the peeling mechanism as will be described hereinafter.

Figure 1:
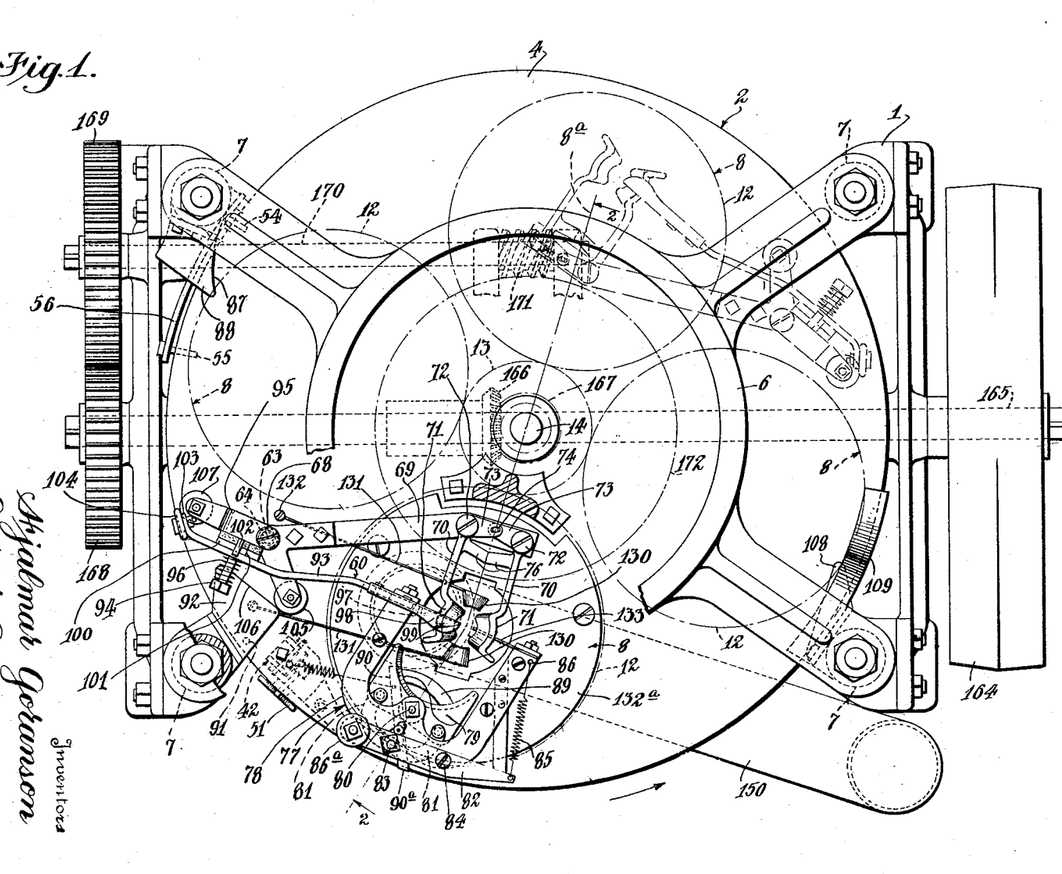
Figure 1 is a plan of the machine, certain parts being broken away and shown in section.

In the present machine a number of peeling devices or units 8 are mounted on the rotary table, and in this machine there are four of these peeling devices, as indicated by the circular outlines in Figure 1. These peeling devices are preferably disposed equidistant from each other on the rotary table. During the operation of the machine the rotary table is rotated, and as each peeling device moves around the central axis of the table its mechanism is controlled so as to enable it to perform the different necessary operations in peeling the fruit.

We will now describe one of the peeling units or peeling devices.

When adapting these peeling mechanisms to a machine of this type we provide a plurality of openings 9 through the lower plate 5 of the table. In each of these openings we mount a fixed tubular arbor or sleeve 10, and the rotary peeling mechanism rotates about this arbor. That is to say, the peeling mechanism rotates on the vertical central axis of this arbor; in doing so the peeling cutters remove the peel from the fruit while the fruit is held against rotation and is moved down automatically past the peeling cutters, eventually passing through the tubular arbor 10 and out of the machine.

Each peeling mechanism also includes a rotary carriage 11 of circular form, and its outer face is provided with gear teeth 12 which constitute a gear wheel meshing with a central driving gear or pinion 13 carried on the central vertical shaft 14 of the machine.

Figures 5, 6:
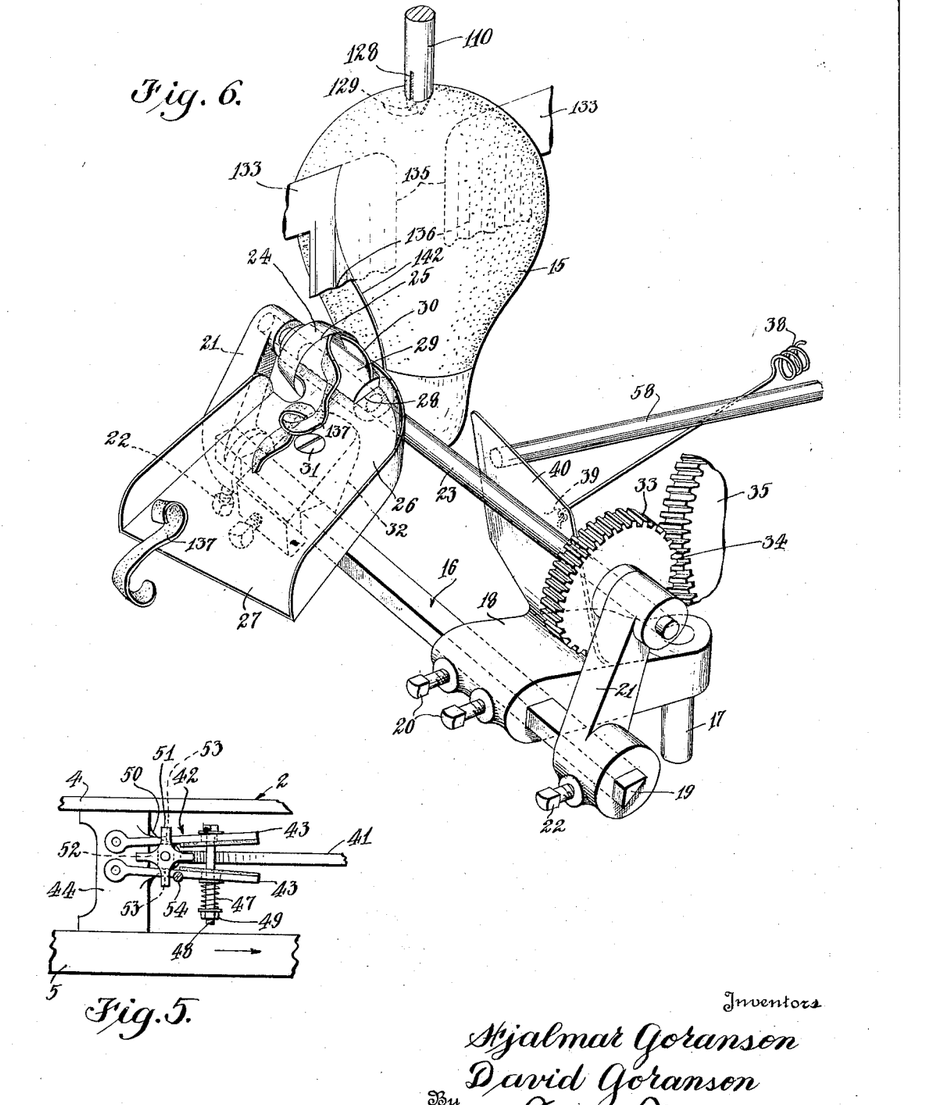
Figure 5 is a section taken about on the line 5—5 of Figure 4, showing part of the edge of the rotary table, and further illustrating the automatic means for controlling the operation of the peeling cutters, certain parts being broken away.
Figure 6 is a perspective of one of the cutter frames and showing the cutter mechanism mounted upon it to illustrate the manner in which the fruit is presented to the cutters. This view also illustrates part of the driving mechanism through which each cutter is rotated.

Referring to Figure 6, 15 represents the fruit, for example, a pear, which is being presented to the peeling cutters. In this view, however, only one of the peeling cutters is illustrated, although in the actual machine there are preferably two of these cutters operating upon opposite sides of the fruit.

Each cutter is mounted upon a cutter frame 16 and each of these frames is mounted to rotate on a vertical axis on the upper side of the carriage 11. As illustrated in Figure 6, each frame 16 is provided with a vertical swivel shaft 17 which extends down into the upper face of the carriage 11 and permits the cutter frame to swing toward or from the fruit. The cutter frame comprises a bracket 18 attached to the upper end of the swivel shaft 17 and carrying an adjustable bar 19. This bar can be adjusted longitudinally so as to control the position of the cutter with respect to the fruit and can be clamped in any position by screws such as screws 20. The adjustable bar 19 carries a pair of adjustable arms 21 which are rigidly secured to it in any position by set screws 22 respectively; the cutters are preferably in the form of rotary cutters; for this purpose the upper ends of the arms 21 carry a shaft 23 which drives a rotary peeling cutter 24. This peeling cutter is a blade of annular form and of slightly conical shape, the cutting edge 25 being formed at the large end of the truncated cone which forms the cutter. Adjacent to the cutter 24 a guide 26 is provided for guiding the peelings away from the fruit; it is in the form of a shallow, open chute. Its bottom plate 27 has a rectangular opening 28 at its inner end which fits over the upper side of the tubular hub 29 of the cutter. This holds the chute in the proper relation to the cutter to receive the peeling from it. In addition to this, the hub 29 is provided with a curved guard finger 30 which extends up and lies against the face of the fruit so as to hold the knife in a proper relation to the fruit to remove the peel as the peeling mechanism rotates on the vertical axis of the arbor 10. The bottom plate 27 of this guide chute 26 may be attached by a screw 31 to an adjustable block or bracket 32 secured to the adjusting bar 19.

In order to drive the shaft 23, it is provided at its end adjacent to the swivel shaft 17 with a gear wheel 33. This gear wheel is in a substantially vertical plane, and one edge 34 of this gear wheel is substantially in line with the vertical axis of the swivel shaft 17; at this point or edge 34, the gear 33 meshes with a driving gear 35 on the carriage 10 to rotate the gear 33. The relation of the driving gears 35 is clearly shown in Figure 4. Each of the gears 35 is rigid with a small gear wheel or bevel pinion 36 which meshes with the teeth on the under side of a ring gear 37, mounted in the upper plate 4 of the table. By reason of the fact that the meshing point 34 of the gears 33, 35 is in line with the axis of the swivel shaft 17, it will be evident that the connection between the gears 33, 35 will be maintained at all times when the cutter frame 16 swings toward or away from the fruit; in other words, this construction permits the cutter frame to swing on the axis of the swivel shaft 17, although the driving connection of the gears 33, 35 is constantly maintained.

We provide means for yieldingly holding each cutter 24 against the side of the fruit. For this purpose we provide each cutter frame with a coil spring 38 the end of which is attached to a lug 39 on a plate 40 which is rigid with the bracket 18 and extends up from it.

We provide automatic means for controlling the position of the cutter frame 16 so as to enable the springs 38 to hold the cutters 24 against the face of the fruit at the proper times, and to move the cutters away from the fruit when that is necessary. For this purpose we provide a ring 41 on the upper end of the carriage 11. It is supported on a shoulder on the carriage and is capable of a small amount of rotary movement with respect to the carriage. At a predetermined time we hold this ring 41 against rotation, and this produces a relative movement between it and the carriage. We utilize this relative rotary movement to control the cutters and to control the peeling cutter frames 16. In order to hold the ring 41 at the proper time we provide a brake device 42, see Figure 5.

Figures 2, 7:
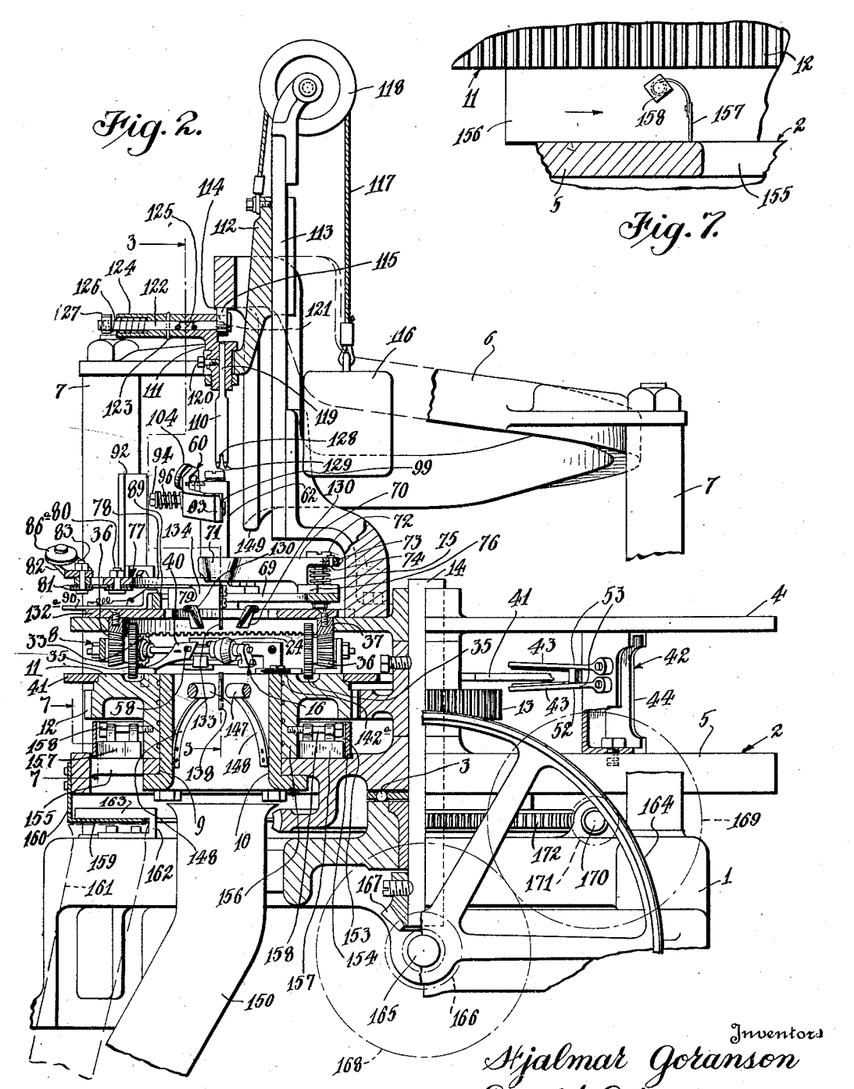
Figure 2 is a side elevation and partial section through the machine, certain parts being broken away. This view shows one of the peeling devices and its contiguous parts in vertical section.
Figure 7 is a vertical section taken about on the line 7—7 of Figure 2 but upon an enlarged scale, showing a portion of the rotary table, and particularly illustrating the means for moving the peelings into the opening in the table during the operation of the machine.

The brake device includes two brake levers 43 which are pivotally mounted on a short channel shaped post 44 between the two plates 4 and 5 of the table (see Figure 2). The brake levers 43 project over the edge of the ring 41 so that when they approach each other they will hold the ring and thereby produce a relative rotation of the ring on the carriage.

Figure 4:
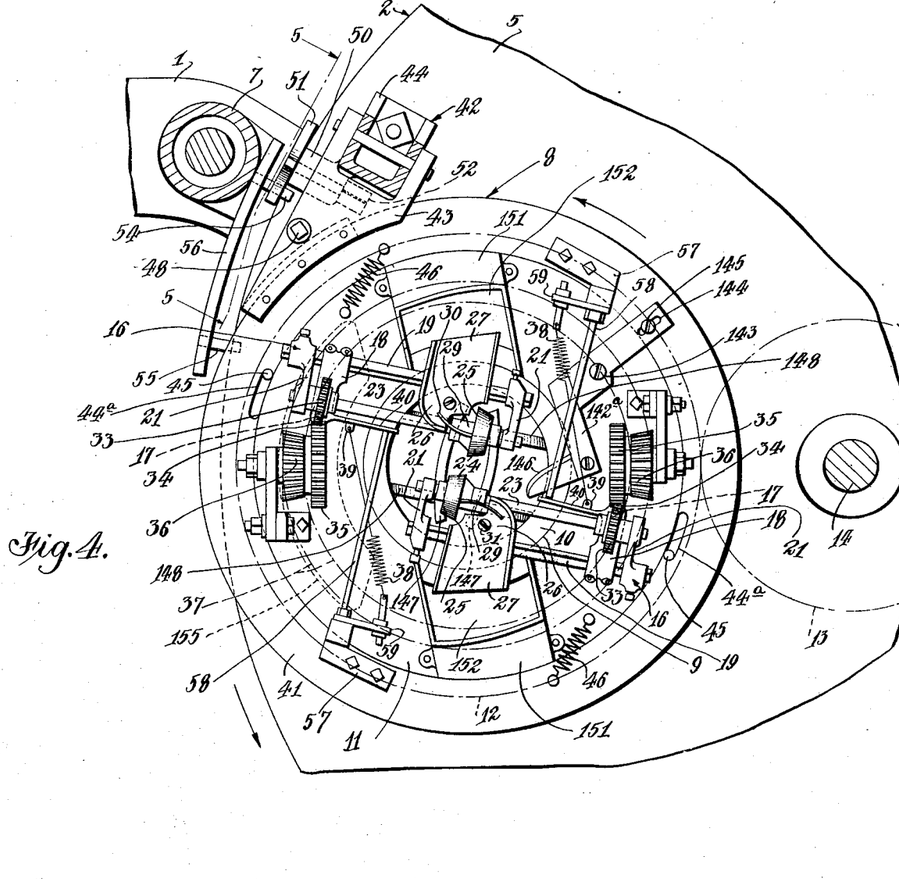
Figure 4 is a plan showing one of the peeling mechanisms or peeling devices upon an enlarged scale, and also illustrates the means for automatically controlling the peeling cutters.

The amount of rotation of the ring on the carriage is determined by two circumferential slots 44a in the inner edge of the ring, which co-operate with corresponding pins 45 that project up from the upper face of the carriage. Coil springs 46 are provided which hold the ring 41 in an extreme position, see Figure 4. One end of each spring 46 is attached to the ring and the other end is anchored on the upper face of the carriage. The direction of rotation of the carriage being left-hand or anti-clockwise, as indicated in Figure 4, it will be evident that when the brake device 42 is operated, the ring 41 will be held relatively fixed for a while until the ring moves back sufficiently to engage the forward ends of the slots 44a (with respect to the direction of rotation) with the pins 45. After this occurs, of course, the brake device 42 cannot hold the ring fixed, but the ring will again take up its rotation with the carriage; that is to say, it simply slips through the brake.

In order to apply the brake device the brake levers 43 are pressed toward each other by a coil spring 47, see Figure 5, which is disposed around the stem 48. This stem is anchored in the upper brake lever 43 and passes through an opening in the lower brake lever, the spring 47 being disposed below the lower brake lever. The tension of this spring may be adjusted by means of an adjusting nut 49 on the end of the stem or bolt 48. In order to open up the brake levers 43 and permit them to come together periodically, we provide the post 44 with a bearing 50 which receives the shaft of a pin wheel or star wheel 51, the inner end of said shaft having an angular neck 52 which extends transversely between the plates or levers 43. The star wheel 51 has four radial arms. In the path of these arms two pins 54 and 55 project, said pins being carried on a curved plate 56 attached to one of the standards or posts 7, already described.

As the rotary table rotates, the pin 54 strikes one of the arms of the star wheel 51 and rotates the angular neck 52 through 90 degrees. This moves the narrow face 53 of the neck away from the face of the lever 43, and brings the "flats" of the neck substantially parallel with the plane of the ring 41; this permits the spring 47 to move the brake levers closer together and clamp them against the ring. When the star wheel engages the next pin 55 it operates to rotate the pin wheel 51 through another 90 degree angle, and this brings the angular neck 52 again to the position shown in Figure 5. This leaves the brake levers 43 held away from the ring.

On each ring 41 a bracket 57 is provided, and each of these brackets is provided with a stem 58 which extends over so that its end abuts against one of the plates 40, see Figures 4 and 6. When the ring 41 is held back by the brake as described, each stem 58 moves relatively backward on the carriage (with respect to the direction of rotation) and this swings its corresponding cutter frame 16 on the pivotal axis of the swivel shaft 17.

Each bracket 57 is provided with a plate 59 which provides anchorage for the outer ends of the springs 38 that have already been described. These springs, as stated, operate to pull the cutter arms 16 in the direction to hold the cutters 24 against the fruit. Of course, when the stems 58 shove against the plates 40 these springs 38 will be further extended.

We will now describe the means for holding the fruit and cutting off one of its ends.

Figure 3:
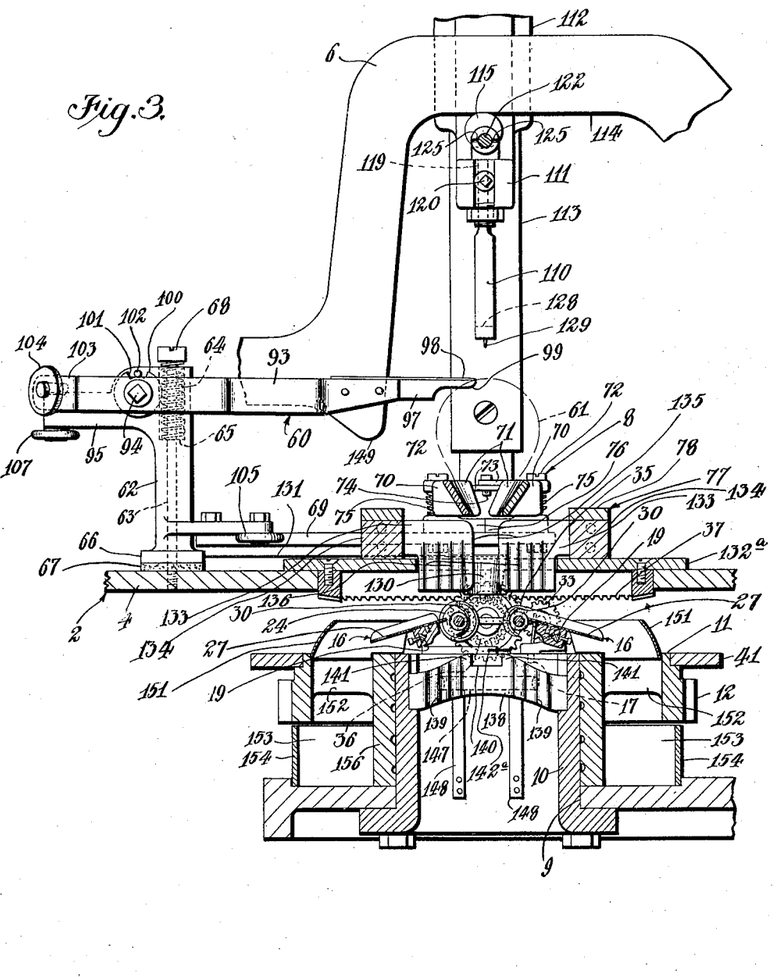
Figure 3 is a vertical section through one of the peeling mechanisms and its contiguous parts upon a larger scale than Figure 2; this section is taken about on the line 3—3 of Figure 2. Among other things, this view illustrates the holding arm or steadying arm that co-operates with the holding means to hold the fruit upright in the holding means.

Referring particularly to Figures 1 and 3, on the upper plate 4 of the table, we provide upper holding and guiding means including a holding device 60. This holding device is constructed so as to hold the fruit (indicated at 61 in dotted lines) in an upright position, so as to facilitate cutting off the lower end of the fruit, and after the lower end of the fruit is cut off, the fruit holder operates to move the fruit over into alinement with the peeling mechanism; after which the machine operates automatically to advance the fruit through or past the peeling mechanism. Each fruit-holder comprises a swivel post 62 mounted to rotate on its longitudinal axis. In other words, this post is mounted on a central stud 63, and in the upper part of the post a spring 64 is provided which thrusts against a shoulder 65 so as to press the foot 66 of the post down against a washer 67 of compressible material, such as leather. The upper end of the spring 64 thrusts against the under side of the head 68 of the bolt. In this way a frictional resistance is offered to rotation of the post, so that the post will operate to remain in any position in which it is left. An arm 69 is rigidly attached to the post, and extends out so that its end is located over the corresponding peeling mechanism, see Figure 1. The end of this arm supports two levers 70, each lever terminating in a jaw 71 that is concave on its inner side to fit against the under side of the fruit, see Figure 3. In other words, these two jaws 71 are constructed so that they conform to the shape of the lower end of the fruit. In the present instance the fruit to be peeled is supposed to be a pear, which is inserted with its small end down; hence, in this case these jaws taper toward their lower ends so that they co-operate to form a rudimentary cup to support the pear. The levers 70 are in the form of bell-crank levers mounted on pivot pins 72 respectively on the end of the arm 69, and they have short arms 73 which are connected together by a pin-and-slot connection 74, so that the levers will move in unison. On each pivot pin 72, a coil spring 75 is provided, and these springs exert their force in a direction to swing the levers 70 toward each other and press the jaws 71 against opposite sides of the fruit.

In order to limit the swinging movement of the levers 70 toward each other their inner sides are provided with stop arms 76 respectively, the ends of which abut against each other (see Figure 1).

In the operation of the machine, the fruit is inserted between the jaws 71 when the peeling device corresponding to the unit is located on the radial line 8a, as shown in Figure 1. At this time the jaws 71 are not located at the central axis of the peeling mechanism, but they are located over toward the edge of the table and toward the outer edge of the peeling device. In other words, when a certain peeling device is on the line 8a, the jaws 71 are in a position to hold the fruit over its corresponding cutting device 77, which operates to cut off the lower end of the fruit. When this occurs, the lower end of the fruit always rests on the segment 89 so that all the fruit will have the same length cut off from its end. One of these cutting devices will now be described.

It includes a U-shaped frame 78 mounted rigidly on the upper end of the carriage, and a short distance above its upper face. (See Figure 2.) Between the cutter frame 78 and the upper plate 4 of the rotary table, two knives 79 are provided which are attached in the manner of scissors on a common pivot pin 80 on the under side of the U-shaped plate 78. These knives or shears are connected by links 81 and a pin 83 to an actuating lever 82, mounted on a pivot pin 84 on the cutter-frame 78, and one end of the lever carries a coil spring 85 anchored at 86, which operates to hold the lever in position to hold the shears or knives 79 apart, and in the position in which they are illustrated in Figure 1. The other end of the lever 82 is provided with a cam roller 86a. Soon after the fruit is inserted when the peeling device is on the line 8a, the revolution of the table 2 will bring the roller 86a against the face 87 of a cam 88 fixed on the frame of the machine. This swings the lever 82 in the direction to move the pivot pin 83 inwardly toward the central axis of the carriage 11, and this swings the knives or shears 79 toward each other so as to cut off the lower end of the fruit. This deposits the cut off end of the fruit on a small segment shaped plate 89 (see Figure 1).

We provide means for "kicking" the severed end of the fruit off of the segment 89. For this purpose we provide a lever 90, one end of which swings along the segment 89 and the other end 90a of which projects outwardly so that its path of movement, as the table rotates, brings it into engagement with a pin 91 that is relatively fixed, and which projects downwardly from the under side of a cam 92 the function of which will be described hereinafter.

In order to hold the fruit securely in place when it is inserted between the jaws 71 we provide a steadying arm 93 which is pivotally mounted on a horizontal pivot bolt 94 on the side of an arm 95 projecting out from the post 62 (see Figures 1 and 3). The pivot bolt 94 is provided with a coil spring 96 which clamps the steadying arm 93 against the side of the arm 95. In other words, the construction is such that the arm is frictionally held in any position in which it is placed. At its inner end this steadying arm 93 is provided with a finger 97 to engage the fruit 61 at its upper end. This finger 97 has a horizontal flange 98 and a vertical knife 99, the tip of which will cut into the upper side of the fruit as indicated in Figure 3. When the fruit is inserted between the jaws 71 this arm 93 will have an elevated position. The operator of the machine when he inserts the fruit, swings the end of the arm down so that the finger 99 engages with the fruit in the manner indicated.

In order to limit the up-and-down movement of this steadying lever, it is provided with a rigid hub 100, having a small notch 101 in its periphery, and the edges of this notch co-operate with a fixed pin 102 on the arm 95, as will be readily understood, to limit the movement of the arm.

The tail end 103 of the steadying arm or lever 93 carries a cam roller 104 which engages with a cam to be described hereinafter on the frame of the machine, to restore this lever or steadying arm to its raised position.

In the operation of the machine, after the lower end of the fruit has been cut off as described, the arm 69 is swung automatically inwardly toward the central axis of the rotary table 2 so as to bring the axis of the fruit into alinement with the central axis of the peeling unit or peeling mechanism. In order to do this we provide a cam roller 105 (see Figure 1) rotatably mounted on the arm 69, and during the rotation of this machine this roller rides on the face 106 of the cam 92, already referred to as carrying the pin 91. The roller 105 rides along the cam and swings the arm 69 into the position in which it is shown in Figure 1.

In order to raise the arm 69 and restore it to its outermost position so that the jaws will lie over the shears or cutting device 77, we provide a restoring roller 107, see Figure 3, which is on the under side of the arm 95 which extends out from the post 62. During the rotation of the rotary table 2, this roller engages a restoring cam 108 which is mounted on the frame of the machine, see Figure 1. Adjacent to this restoring cam 108 which restores the arm 69 to its outermost position, we provide another restoring cam 109, for restoring the holding arm or steadying arm 93 to its raised position. This cam 109 co-operates with the cam roller 104 already referred to and carried on the tail end 103 of the arm 93.

After the fruit has had its lower end cut off and is moved back into a central position over the axis of the peeling knife, that is to say, when the jaws 71 have returned to the position in which they are illustrated in full lines in Figure 1, the machine operates automatically to advance the fruit downwardly past the peeling mechanism; in other words, between the peeling cutters 24, one of which is illustrated in Figure 6. This is accomplished through the medium of a pusher stem 110 (see Figure 2) which is adjustably secured in a bracket 111 attached to a pusher block 112. This pusher block is guided to slide vertically on a suitable guide 113 that is mounted on the upper side of the rotary table 2. The bracket 111 is provided with means for engaging the underside of the circular cam 6, the lower edge 114 of which guides the pusher stem 110. For this purpose the bracket 111 is provided with a cam roller 115 that rolls along the under edge of this cam. During this operation the roller is held up against the cam by means of a weight 116 attached to a cord or strap 117 passing over a pulley 118, the outer end of the cord being anchored to the upper end of the pusher block 112.

In order to provide a permanent adjustment for the pusher stem 110 we provide the same with a shank 119 which is secured in place by set screw 120. However, it is desirable to provide means enabling the position of the pusher stem to be adjusted while the machine is in operation so as to adapt it to operate upon fruit of different length. In order to accomplish this we mount the roller 115 on an eccentric hub 121 which is carried on the inner end of a spindle 122. This spindle is provided with some adjusting means for holding it in different rotated or oriented positions. For this purpose the spindle may be attached by a pin 123 to a sleeve 124, said sleeve being rotatable on the axis of the spindle. The inner end of the sleeve 124 has a tooth which fits into a notch 125 on the outer end of the bracket 111. By rotating this sleeve through 180 degrees the tooth on the sleeve 124 can be brought into engagement with another notch corresponding to the notch 125, thereby holding the eccentric hub 121 in a position 180 degrees removed from its first position. In this way the full effect of the eccentric hub 121 can be utilized to give a certain adjustment of the bracket 111 with respect to the cam 6. The sleeve 124 is held against the outer end of the bracket 111 by means of a coil spring 126 the outer end of which thrusts against a nut 127 on the outer end of the spindle 122.

The lower end of the pusher stem 110 is provided with a vertical slot 128 so that two points or nibs 129 are formed to engage the fruit. These nibs help to hold the fruit against rotation as it passes down through the cutting mechanism. In order to guide the fruit as it passes down, and hold it properly to present it to the peeling cutters 24, we provide two auxiliary jaws 130 which are disposed a considerable distance below the jaws 71, and these jaws 130 are supported in such a way that they swing toward the fruit on a line substantially at right-angles to the line on which the jaws 71 swing when they move toward or away from the fruit. These auxiliary jaws may be in the form of slightly curved plates which converge in a downward direction. Each jaw 130 is mounted upon an arm 131 (see Figure 1), which may consist of a stout wire anchored at 132 on a pin attached to the upper side of the rotary table 2. These arms 131 may rest on the upper side of a plate 132a carried on top of the upper plate 4 of the rotary table, and this plate supports the aforesaid ring gear 37.

When the fruit is moved downwardly by the pusher stem 110 it forces the jaws 71 apart, and at two opposite points the fruit is engaged or impaled upon two impaling blades 133, see Figure 6. These impaling blades are supported on two blocks 134 carried on the upper side of the plate 132a (see Figure 2); they project in from opposite sides toward the longitudinal axis of the carriage 11, but with their edges 135 located somewhat apart so that a gap is formed between these edges through which the pusher stem 110 can pass downwardly. The upper edges of these impaling knives are preferably straight, but their lower portions are preferably formed with vertical corrugations 136. After the fruit has been impaled on the impaling knives as indicated, the jaws 130 operate to keep the two half-portions of the fruit held in. In other words, the jaws 130 keep the two nearly severed halves of the fruit, in place.

As the fruit is forced downwardly by the lower edge of the cam 6, the peeling cutters 25 are rotating with the carriage 11 around the fruit, so as to remove the peel, and portions of this peeling such as indicated at 137 pass onto the chutes 27 and are guided out of the machine by mechanism which will be described hereinafter. Below the peeling mechanism we provide lower holding and guiding means as will now appear.

As the fruit progresses downwardly through the action of the pusher stem 110, its lower edge, after passing the cutters 24 engages a fixed guide in the form of a blade or knife 138 which extends transversely in the upper end of the tubular arbor 10 (see Figures 2 and 3). This blade preferably has vertical corrugations 139. Its middle portion at its upper edge, is formed into a notch 140 which is adapted to receive the lower end of the pusher stem 110. In the operation of the machine the slot 128 at the lower end of this stem finally engages the edge of the blade 138 at the bottom of the notch 140. It will be noted that this guide-blade 138 is in line with the impaling blades 133. The blade 138 on each side of the notch 140 has upwardly extending projections 141 to engage in the slits 142 which are formed by the impaling blades 133 at each side of the fruit. As the fruit descends beyond the knife 138 its core is cut or divided longitudinally, but the presence of the notch 140 produces a delayed action in the completing of the cut of the core. After the fruit has descended so that it is nearly past the knife 138, but while the upper end of the fruit is disposed slightly above the projections 141, an automatic cutter cuts off the upper end of the fruit. This cutter is in the form of a knife 142a (see Figure 4), which is mounted to swing on a pivot 143 on the upper face of the carriage 11. The tail end of this knife lever 142a has a slot 144 which receives a bolt or screw 145 fastened in the upper side of the ring 41. When the brake 42 operates to hold back the ring 41 as described above, the pin 145 cooperates with the slot 144 to produce a relative swinging movement of the knife lever 142a in a right-hand direction on its pivot 143. This knife lever 142a carries a knife or blade 146; when the lever swings in the manner described, the edge of this blade moves in to a point near the axis of the fruit, and as the carriage 11 rotates, this blade passes around the axis of the fruit and severs the upper end or tip of the fruit from the body of the fruit.

On each side of the blade 138 we provide resilient holders 147, the bodies of which are slightly bowed away from the blade 138 (see Figure 2), and these bow-shaped blades are supported on leaf-springs 148. In other words, these leaf-springs are attached on the inner side of the fixed tubular arbor 10 and they hold the bows 147 against the side of the fruit so as to keep the nearly severed parts together.

After the upper end of the fruit is cut off as described above, the cam roller 115 arrives at a downwardly projecting toe 149 upon the cam 6, which gives the stem 110 the final push that moves the fruit down far enough to have the edge of the notch 140 pass completely through the core of the fruit, and the fruit then falls down through the tubular arbor 10 into a tubular duct or chute 150 (see Figure 2). The toe 149 of this cam is directly over this chute.

We will now described the means for guiding the peeling of the fruit out of the machine.

Referring to Figure 3, it will be noted that the chutes or guides 27 for the peelings are inclined downwardly toward their outer ends. These ends project into upwardly curved hoods or aprons 151 which may be made of light sheet metal. (See Figure 3.) These hoods guide the peelings so that they will pass downwardly through openings 152 in the upper portion of the carriage. In this way the peelings are caused to fall down into an annular chamber, or receptacle 153 surrounded by an annular wall, or ring 154.

The bottom of chamber 153 is formed by a portion of the plate 5 which forms the lower plate of the rotary table 2. At a certain point, preferably near its outer side, this bottom wall has an opening 155, see Figure 2. The middle portion of the carriage 10 is formed into an annular hub or center 156 and this hub carries means for scraping the bottom of the receptacle 153. This means may be in the form of two or more scrapers 157, which are radial plates each supported on a bolt 158 which extends radially out from the hub 156. The detail of these scrapers is illustrated in Figure 7. As the carriage rotates, the lower edge of these scrapers pass along the bottom wall of the chamber and advance the peelings until they come over the opening 155; when they arrive there the peelings fall through the opening onto a relatively fixed shelf 159 (see Figure 2). This shelf is disposed in a horizontal position and has a foot 160 which extends out and is attached to the outer edge of the lower plate 5 of the rotary table. At a certain point on the frame 1, a peeling chute is provided, the location of which is indicated by the dotted line 161. Nearly in line with the chute 161, the frame is provided with a fixed bracket 162 having a horizontal finger or plate 163 which extends across just above the path of the shelf 159. As the shelf 159 passes the bracket 162, the finger or plate 163 scrapes the peelings off of the shelf and they fall down into the chute 161.

The rotary table 2 may be rotated, and the carriage 11 also rotated, by any suitable means. In the present machine, as illustrated, we provide a belt pulley 164 (see Figures 1 and 2) which is attached to a horizontal shaft 165. This shaft carries a bevel gear 166 which meshes with a bevel gear 167, which is rigid on the lower end of the vertical shaft 14 already described. This rotates the center gear wheel 13 which meshes with the gear teeth 12 of the different carriages 11, so as to rotate them.

In order to rotate the table, the shaft 165 carries a gear wheel 168 (see Figure 1) which meshes with a corresponding gear wheel 169 carried on a worm shaft 170 carrying a worm 171, which meshes with a worm-gear 172 formed on, or carried upon, the lower part of the rotary table 2.

We shall now describe the general mode of operation of the machine.

When the fruit is introduced into the machine, the peeling unit or peeling mechanism which receives the fruit is located on the line 8a of Figure 1, and at this time the arm 69 that carries the jaws 71 is located in an outwardly disposed position (see the dotted lines in Figure 1) so that the two jaws 71 are disposed above the shear blades 79. The operator puts the fruit in place between these jaws, and then pulls down the steadying arm 93 until its blade 99 engages the upper end of the fruit as indicated in Figure 3. This steadies the fruit. As the rotary table 2 moves around, the cam 87 engages the roller 86 of the cutter lever 82 and this rocks this lever at its pivot 84 so that the shear blades 79 approach each other and cut off the lower end of the fruit. The nub or end of the fruit cut off, falls down onto the segment 89 (see Figure 1) and is immediately kicked off this segment by kicking lever 90, the outer end of which is engaged by the pin 91. This swings the inner end of the lever toward the right as viewed in Figure 1 and scrapes the nub of the fruit out of the machine, permitting it to fall upon the ground.

After the lower end of the fruit has been severed in this way, the cam roller 105 on the arm 69 strikes the cam 92, and this operates to swing the post 62 on its vertical axis and brings the lever 69 approximately to the position in which it is indicated in Figure 1. This will bring the axis of the fruit into line with the axis of the carriage of the peeling mechanism. In this swinging movement it will be noted that the lower end of the fruit passes laterally into the notch or gap between the edges 135 of the impaling knife 133. After the fruit arrives in this position the pusher stem 110 commences to descend through the action of the cam 6.

This stem moves down so that its nibs 129 engage the upper end of the fruit and assist in preventing rotation of the fruit on its vertical axis. As the fruit descends it spreads the jaws 71 further apart; this outward movement of the jaws is permitted by the springs 75 on the pivot pins 72 of the jaws. The lower end of the fruit then becomes impaled on the impaling knives 133 which pass into the fruit at the slits 142 at diametrically opposite points. These impaling blades effectually prevent the fruit from rotating while it is being peeled by the peeling cutters 24. The peeling cutters are held against the face of the fruit by the springs 38, see Figure 6, which are attached to the cutter frames 16. While the peeling cutters 24 are held against the face of the fruit the carriage rotates on its vertical axis so that the cutters pass around the fruit, removing the peel. As stated above, these cutters 24 are preferably rotatable on their own axis. In other words, as the cutters move around the fruit, they are rotated on the axis of their shaft 23. This rotation is accomplished through the medium of the gears 33 and 35, the former of which is carried on the shaft 23, and the latter of which is rigid with pinion 36 supported on the upper side of the rotary carriage 11 (see Figure 2). As the carriage rotates, each pinion 36 is rotated by reason of its engagement with the underside of the bevel gear or ring 37 supported on the upper plate 4 of the rotary table. The meshing point 34 of the two gears 33 and 35 is in line with the vertical axis of the swivel shaft or post 17 on which the peeling cutter frame swings. In this way the driving gear wheel 35 maintains its meshing engagement with the gear 33 in any position in which the cutter frame may be placed.

As the peeling passes off of the fruit it is guided into the chute 27 which delivers the peeling into its corresponding hood 151, from which the peeling passes downwardly through opening 152 into the peeling receptacle or chamber 153. From this peeling receptacle the peeling is ejected by revolving scrapers 157 carried on the carriage 11 which advances the peeling into position over the opening 155 in the bottom of the peeling chamber. This enables the peeling to fall onto the shelf 159 carried by the rotary table. As this shelf passes a fixed bracket 162, the peelings are scraped off of it, so that they fall into a peeling chute 161.

As the fruit passes the level of the peeling cutters 24 its lower end engages the guide knife 138, and after the fruit has descended so that it is nearly cut in two by this knife, the cutter lever 142 is actuated to cut off the upper end of the fruit. This movement of the cutter lever is caused by the operation of its corresponding brake-device 42. This brake-device is actuated by the pins 54 and 55 (see Figure 4). The pin 55 strikes the star wheel 51 and co-operates with the spring 47 to rotate the flat faced neck 52 into a position such that the wide faces are substantially parallel with the brake plates 43. This will permit the spring 47 of the brake to press the brake-plates against the edge of the ring 41. This detains or holds back the ring temporarily and produces a relative movement of the ring on the carriage; this relative movement actuates the knife lever 142a. This relative movement of the knife lever 142a operates to swing the cutter frames 14 apart so as to permit the fruit to pass down. About the time that this occurs the lower end of the fruit which was nearly severed is held against the blade 138 by the bow-shaped holders 147 (see Figure 2), which are supported on springs 148, which exert their force to press the halves of the fruit toward the knife 138.

The continued downward movement of the pusher-stem finally effects the complete severing of the fruit into two halves, and when this occurs, the slot 128 in the lower end of the pusher-stem receives the edge of the blade 138 at the notch 140. This completely severs the core of the fruit. This final movement is occasioned by the toe 149 of the cam which gives the stem 110 the final movement that completes the severing of the fruit into its two halves.

The cutter frames for the peeling frames 24 are constructed so that they may be readily adjusted to position the cutting edge 25 properly with respect to the fruit 15 (see Figure 6). Such an adjustment can be effected by loosening the set-screws 20 and pulling the bar 19 in or out through the bracket 18 which supports it. However, when any such adjustment is made, it may be necessary to change the position of the gear wheel 33 on its shaft 23. For this reason this gear wheel should be adjustably secured to the shaft 23 in any suitable manner, for example, by means of a set-screw, not illustrated. Where it is desired to adjust the position of the pusher-stem 110 to correspond with different size pears, this may be accomplished by rotating the sleeve 124; this will rotate the spindle 122 through 180 degrees or less and this adjusted rotation of the spindle changes the position of the eccentric hub 121 carried on the end of the spindle, and which carries the roller 115.

It is understood that the embodiment of the invention described herein is only one of the many embodiments this invention may take, and we do not wish to be limited in the practice of the invention, nor in the claims, to the particular embodiment set forth.

What we claim is:

1. In a fruit peeling machine, the combination of peeling mechanism, cutting means located to one side of the peeling mechanism for cutting off the end of the fruit, a holding device for holding the fruit to present the same to the cutting means, a rotary table supporting the peeling mechanism, and automatic means actuated as the table rotates for moving the holding device to bring the fruit into alinement with the peeling mechanism.

2. In a fruit peeling machine, the combination of peeling mechanism, cutting means located to one side of the peeling mechanism for cutting off the end of the fruit, a holding device for holding the fruit to present the same to the cutting means, a rotary table supporting the peeling mechanism, automatic means actuated as the table rotates for moving the holding device to bring the fruit into alinement with the peeling mechanism, and means for advancing the fruit thereafter past the peeling mechanism.

3. In a fruit peeling machine, the combination of peeling mechanism, cutting means located to one side of the peeling mechanism for cutting off the end of the fruit, a holding device for holding the fruit above the peeling mechanism, and including jaws for supporting the fruit in an upright position, and a movable arm for engaging the fruit above the jaws to hold the same upright, means for moving the holding device into position over the cutting means, means for moving the holding device thereafter to bring the fruit into alinement with the peeling mechanism, and means for advancing the fruit thereafter past the peeling mechanism.

4. In a fruit peeling machine, the combination of peeling mechanism, cutting means located to one side of the peeling mechanism for cutting off the end of the fruit, a holding device for holding the fruit to present the same to the cutting means, means including jaws for engaging and supporting the fruit, and a movably mounted steadying arm adapted to be actuated by hand to engage the fruit and hold the same upright, the said holding device having an axis of rotation enabling the same to place the fruit in alinement with the cutting means when the end of the fruit is to be cut off, means for moving the holding device to bring the fruit into alinement thereafter with the peeling mechanism, and means for advancing the fruit past the peeling mechanism.

5. In a fruit peeling machine, the combination of peeling mechanism, cutting means located to one side of the peeling mechanism for cutting off the end of the fruit to present the same to the cutter, means including a swivel post to support the fruit, and a movable arm carried on the post to engage the upper part of the fruit and hold the same upright, the said supporting device operating to hold the fruit in alinement with the cutting means to enable the end of the fruit to be cut off, means for swinging the holding device on the axis of the swivel post to bring the fruit thereafter into alinement with the peeling mechanism, and means for advancing the fruit past the peeling mechanism.

6. In a fruit peeling machine, the combination of a rotary table, peeling mechanism mounted on the table, cutting means mounted on the table and located to one side of the cutting table for cutting off the end of the fruit, a holding device movably mounted on the table for holding the fruit to present the same to the cutting means, and including a steadying arm and jaws for holding the fruit upright, said steadying arm mounted to rotate on an axis on the table, said holding device operating to hold the fruit over the cutting means, automatic means for operating the cutting means to cut off the end of the fruit, automatic means for swinging the holding device on its axis of rotation to bring the fruit into alinement with the peeling means, and automatic means for advancing the fruit thereafter past the peeling mechanism.

7. In a fruit peeling machine, the combination of a rotary table, peeling mechanism mounted on the table, cutting means mounted on the table and located to one side of the cutting table for cutting off the end of the fruit, a holding device movably mounted on the table for holding the fruit to present the same to the cutting means, and including a steadying arm and jaws for holding the fruit upright, said steadying arm mounted to rotate on an axis on the table, said holding device operating to hold the fruit over the cutting means, automatic means for operating the cutting means to cut off the end of the fruit, automatic means for swinging the holding device on its axis of rotation to bring the fruit into alinement with the peeling means, automatic means for advancing the fruit thereafter past the peeling mechanism, and automatic means for cutting off the other end of the fruit.

8. In a fruit peeling machine, the combination of a rotary table, peeling mechanism mounted on the table, cutting means mounted on the table and located to one side of the cutting table for cutting off the end of the fruit, a holding device movably mounted on the table for holding the fruit to present the same to the cutting means, and including a steadying arm and jaws for holding the fruit upright, said steadying arm mounted to rotate on an axis on the table, said holding device operating to hold the fruit over the cutting means, automatic means for operating the cutting means to cut off the end of the fruit, automatic means for swinging the holding device on its axis of rotation to bring the fruit into alinement with the peeling means, automatic means for advancing the fruit thereafter past the peeling mechanism, a cutting device for cutting off the other end of the fruit, and means for operating the same after the fruit has been peeled by the peeling mechanism.

9. In a fruit peeling machine, the combination of a rotary table, peeling mechanism mounted on the table, a cutting device for cutting off the end of the fruit, supported on the table to one side of the peeling mechanism and including a movable knife with a lever for actuating the same, a holding device adapted to hold the fruit in line with the cutting device, a relatively fixed cam for actuating the lever of the cutting device to cut off the end of the fruit as the table rotates, automatic means for moving the holding device thereafter to bring the fruit into alinement with the peeling mechanism, and automatic means for advancing the fruit thereafter past the peeling mechanism.

10. In a fruit peeling machine, the combination of peeling mechanism, a movably supported holding device above the peeling mechanism, a pair of impaling blades between the holding device and the peeling mechanism for cutting into the fruit on opposite sides of the same to hold it as it passes through the peeling mechanism, said impaling blades being disposed apart so as to form a gap there-between, said holding device operating to hold the fruit with its lower end projecting into the said gap, means for cutting off the end of the fruit held in the holding device at one side of the peeling mechanism, and means for moving the holding device thereafter to move the fruit into position in alinement with the peeling mechanism and over the said impaling blades.

11. In a fruit peeling machine, the combination of peeling mechanism, cutting means located to one side of the peeling mechanism for cutting off the end of the fruit, means for holding the fruit to present the same to the cutting means to cut off its end, means for moving the holding means thereafter to aline the fruit with the peeling mechanism, and automatic means for ejecting the severed end of the fruit from the machine.

12. In a fruit peeling machine, the combination of a rotary peeling mechanism, a pair of impaling knives for engaging opposite sides of the fruit to hold the same against rotation, a pusher-stem for pushing the fruit past the impaling knives and past the peeling mechanism, and a second impaling knife in the path of the pusher-stem in substantially the same plane as the impaling knives and having a notch in its upper edge substantially in line with the pusher-stem.

13. In a fruit peeling machine, the combination of a rotary peeling mechanism, a pair of impaling knives for engaging opposite sides of the fruit to hold the same against rotation, a pusher-stem for pushing the fruit past the impaling knives and past the peeling mechanism, and a second impaling knife in the path of the pusher-stem in substantially the same plane as the impaling knives and having a notch in its upper edge substantially in line with the pusher-stem, said pusher-stem having a slot in its lower end adapted to receive the upper edge of said second blade at the bottom of the notch.

14. In a fruit peeling machine, the combination of a rotary peeling mechanism including a peeling knife for engaging the face of the fruit and a ring rotating with the peeling mechanism and mounted so that it is capable of relative movement with respect to the peeling mechanism, means for holding the ring to produce a relative movement between the ring and the peeling mechanism, and means actuated by the same relative movement to control the operation of the peeling knife.

15. In a fruit peeling machine, the combination of a table, a rotary carriage supported on the table, a peeling knife supported on the carriage for engaging the face of the fruit, a ring mounted on the carriage to rotate with the same and capable of a relative movement with respect to the carriage, means for holding the ring to produce a relative movement between the ring and the carriage, and means actuated by the said relative movement to control the operation of the peeling knife.

16. In a fruit peeling machine, the combination of a table, a rotary carriage mounted on the table, a peeling knife movably mounted on the carriage for engaging the face of the fruit, a ring mounted to rotate with the carriage and capable of a relative movement with respect to the carriage, a knife for cutting off the end of the fruit, means for engaging the ring to produce a relative movement between it and the carriage, and means actuated by the said relative movement for controlling the operation of the said knife that cuts off the end of the fruit.

17. In a fruit peeling machine, the combination of a table, a rotary carriage mounted on the table, a peeling knife movably mounted on the carriage, a ring rotating with the carriage and mounted so that it is capable of a relative movement with respect to the carriage, a cutting-off knife for cutting off the end of the fruit, a brake for engaging the ring to detain it and produce a relative movement between the ring and the carriage, and means actuated by the said relative movement to control the operating of the peeling knife and the cutting-off knife.

18. In a fruit peeling machine, the combination of a rotary table, a rotary carriage mounted on the table, a peeling knife for engaging the face of the fruit, movably mounted on the carriage, a ring rotating with the carriage and mounted so that it is capable of a relative movement with respect to the carriage, means for rotating the rotary table, a brake mounted on the rotary table, relatively fixed means for actuating the brake to hold the ring and produce a relative movement between the ring and the peeling mechanism, and means actuated by the said relative movement to control the operation of the peeling knife.

19. In a fruit peeling machine, the combination of a table, a rotary carriage mounted on the table, means for holding the fruit relatively fixed substantially on the axis of rotation of the rotary carriage, a cutter frame pivotally mounted on the carriage and having a peeling cutter to engage the face of the fruit, a ring mounted to rotate with the carriage and capable of a relative movement with respect to the carriage, means for holding the ring to produce a relative movement between it and the carriage, and means actuated by the said relative movement to swing the cutter frame on its axis.

20. In a fruit peeling machine, the combination of a table, a rotary carriage mounted on the table, means for holding the fruit relatively fixed substantially on the axis of rotation of the rotary carriage, a cutter frame pivotally mounted on the carriage and having a peeling cutter to engage the face of the fruit, a ring mounted to rotate with the carriage and capable of a relative movement with respect to the carriage, means for holding the ring to produce a relative movement between it and the carriage, and means actuated by the said relative movement to swing the cutter frame on its axis and move the peeling cutter away from the face of the fruit.

21. In a fruit peeling machine, the combination of a table, a rotary carriage supported on the table, means for supporting the fruit in a substantially fixed position on the axis of rotation of the carriage, a pair of cutter frames pivotally mounted on the carriage and having cutters for engaging the face of the fruit, a ring mounted on the carriage so that it is capable of relative movement with respect to the carriage, means for holding the ring to produce a relative movement between the ring and the carriage, and means actuated by the said relative movement to swing the cutter frames on their axes of rotation and move their cutters away from the fruit.

22. In a fruit peeling machine, the combination of means for holding the fruit relatively fixed, a rotary carriage, a cutter frame having a pivotal axis on the carriage and having a rotary cutter for engaging the face of the fruit, a gear wheel supported on the cutter frame for driving the rotary cutter, said gear wheel having its edge substantially in line with the said pivotal axis of the cutter frame, and means engaging the gear wheel substantially on said axis for driving the same.

23. In a fruit peeling machine, the combination of means for holding the fruit relatively fixed, a rotary carriage, a cutter frame having a pivotal axis on the carriage and having a rotary cutter for engaging the face of the fruit, a gear wheel supported on the cutter frame for driving the rotary cutter, said gear wheel having its edge substantially in line with the said pivotal axis of the cutter frame, a frame for the machine and a gear wheel mounted on the cutter frame, and meshing with the first named gear wheel at its said edge and substantially in line with the said pivotal axis.

24. In a fruit peeling machine, the combination of a table having an upper plate, a rotary carriage supported on the table below the said plate, means on the plate for supporting the fruit in a relatively fixed position on the axis of rotation of the carriage, a rotary cutter mounted on the carriage for engaging the face of the fruit, means for advancing the fruit past the rotary cutter, a wheel mounted on the carriage for rotating the peeling cutter and a ring on the plate for engaging the wheel to rotate the same as the carriage rotates on its axis.

25. In a fruit peeling machine, the combination of a table having an upper plate, a rotary carriage supported on the table below the said plate, means on the plate for supporting the fruit in a relatively fixed position on the axis of rotation of the carriage, a rotary cutter mounted on the carriage for engaging the face of the fruit, means for advancing the fruit past the rotary cutter, a gear wheel mounted on the carriage for rotating the peeling cutter, and a ring gear on the plate for engaging the wheel to rotate the same as the carriage rotates on its axis.

26. In a fruit peeling machine, the combination of a table having an upper plate, a rotary carriage supported on the table below the said plate, means on the plate for supporting the fruit in a relatively fixed position on the axis of rotation of the carriage, a cutter frame having a pivotal axis on the carriage, a rotary cutter mounted in the cutter frame with a gear wheel for driving the same, means for advancing the fruit past the rotary cutter, a bevel pinion mounted on the carriage, a gear wheel rigid with the pinion for meshing with the gear wheel on the cutter frame to drive the cutter, and a ring gear on the plate for engaging the bevel pinion to drive the same as the carriage rotates on its axis.

27. In a fruit peeling machine, the combination of a table having an upper plate, a rotary carriage supported on the table below the said plate, means on the plate for supporting the fruit in a relatively fixed position on the axis of rotation of the carriage, a cutter frame having a pivotal axis on the carriage, a rotary cutter mounted to rotate on the cutter frame and having a gear wheel for driving the same, means for advancing the fruit past the cutter, a ring gear mounted on the plate, a pinion mounted on the carriage and meshing with the ring gear, and a gear wheel rigid with the pinion and meshing with the first named gear wheel at a point substantially in line with the pivotal axis of the cutter frame whereby the cutter frame may be swung toward or from the fruit while maintaining the engagement of the gears.

28. In a fruit peeling machine, the combination of a rotary table having an upper plate, a rotary carriage supported on the table below the said plate, means on the plate for supporting the fruit in a relatively fixed position on the axis of rotation of the carriage, a cutter frame supported on a pivotal axis on the rotary carriage, a rotary cutter supported on the cutter frame for engaging the face of the fruit, means for advancing the fruit past the rotary cutter, a gear wheel mounted on the carriage for driving the rotary cutter, a ring gear mounted on the plate, a pinion mounted on the carriage meshing with the ring gear so that when the carriage rotates the pinion will be rotated, a gear wheel rigid with the pinion and meshing with the first named gear wheel at a point substantially in line with the said pivotal axis of the cutter frame whereby the cutter frame may swing on its pivotal axis while maintaining an engagement between the gears, and automatic means for swinging the cutter frame on its pivotal axis at a predetermined time in the rotation of the table.

29. In a fruit peeling machine, the combination of a table, a carriage mounted to rotate on the table, peeling cutters carried by the carriage for engaging the fruit, means for guiding the peelings from the fruit onto the face of the table, said table having an opening, and means carried by the carriage for moving the peelings along the face of the table and into the said opening through the table.

30. In a fruit peeling machine, the combination of a table, a rotary carriage mounted on the table, a peeling cutter mounted on the carriage for peeling the fruit, means for guiding the peelings onto the face of the table below the carriage, said table having an opening there under the carriage and a scraper carried by the carriage for moving over the face of the table to move the peelings into the said opening.

31. In a fruit peeling machine, the combination of a rotary table, a rotary carriage mounted on the table, a peeling cutter mounted on the carriage for peeling the fruit, means for guiding the peelings onto the face of the table adjacent to the rotary carriage, said table having an opening through it, means on the carriage for advancing the peelings to move the same into said opening, a shelf on the rotary carriage below the said opening in the table and adapted to receive the peelings that fall through the opening, and relatively fixed means co-operating with the shelf to scrape the peelings off the shelf as the rotary table rotates.

32. In a fruit peeling machine, the combination of a frame, a rotary table mounted on the frame, a fruit peeling device mounted on the rotary table, a pusher-stem guided on the rotary table, peeling mechanism, a cam on the frame for actuating the pusher-stem as the rotary table rotates, to push the fruit past the peeling mechanism, and means for adjusting the relative position of the pusher stem with respect to the cam to adapt the same to different sizes of fruit.

33. In a fruit peeling machine, the combination of a frame, a rotary table mounted on the frame, a peeling device mounted on the table, a pusher block, means for guiding the pusher block on the rotary table, a pusher-stem guided by the pusher block, a cam supported on the frame for actuating the pusher-stem to push the fruit past the peeling device, means on the pusher block for engaging the cam, and means for adjusting the position of said last named means to regulate the position of the stem with respect to the said cam to adapt the pusher-stem to fruit of different sizes.

34. In a fruit peeling machine, the combination of a frame, a rotary table mounted on the frame, a peeling device mounted on the rotary table, a pusher block, means for guiding the same on the rotary table, a pusher-stem carried by the pusher block, a cam for actuating the pusher-stem to push the fruit past the peeling device, a roller shaft mounted on the block having an eccentric hub, a roller mounted on the eccentric hub to roll on the cam and actuate the pusher stem, and means for securing the roller shaft in different positions to hold the roller in different positions and thereby regulate the position of the pusher stem with respect to the said cam.

35. In a fruit peeling machine, the combination of means for holding the fruit, a cutter frame having a bracket mounted to swing on an axis, a cutter rotatably supported on the frame and having an edge adapted to engage the face of the fruit, said frame having a bar mounted to slide through the said bracket and extending toward the fruit, and means for securing the bar in the bracket.

36. In a fruit peeling machine, the combination of peeling mechanism, a fruit holder located on one side of the peeling mechanism and comprising a pair of oppositely disposed jaws movable toward or from the fruit, for yieldingly engaging the face of the fruit on opposite sides of its longitudinal axis, another pair of jaws on the other side of the peeling mechanism movable toward or from the fruit for yieldingly engaging the face of the fruit at opposite points with respect to the longitudinal axis of the fruit, said last named jaws being located so as to move in a plane substantially at right angles to the plane of the first named jaws.

37. In a fruit peeling machine, the combination of a frame, peeling mechanism supported in the frame to rotate around an axis, a swinging holder for the fruit capable of swinging to a lateral position to receive the fruit out of line with the axis of rotation of the peeling mechanism, means for swinging the holder so as to bring the fruit into line with the said axis, and means for cutting off the stem end of the fruit while the holder is in said lateral position.

38. In a fruit peeling machine, the combination of a frame, peeling mechanism mounted in the frame to rotate around a vertical axis, a cover on the frame having a central opening in line with the said axis, a swinging fruit holder supported on the frame, having means for engaging the fruit to hold the same and capable of assuming a position at one side of the cover to receive the fruit, means for swinging the holder so as to bring the fruit into position over the said opening and into line with the said axis, and means for holding the fruit in a depressed position within and below said opening, and a pusher with means for controlling same to advance the fruit past the cutters.

39. In a fruit peeling machine, the combination of a frame, peeling mechanism mounted to rotate about a substantially vertical axis, a pusher in the form of a stem mounted above the peeling mechanism and on its axis of rotation, means for guiding the pusher stem to move toward and from the peeling mechanism, a hand-operated lever capable of assuming a position of rest to receive the fruit, and having means for holding the fruit below the pusher stem, and with its axis substantially coinciding with the axis of the stem, and power actuated means for moving the pusher stem down to advance the fruit past the peeling mechanism.

Signed at San Francisco this 1st day of February, 1927.

HJALMAR GORANSON.
DAVID GORANSON.